United States Patent [19]
Welch et al.

[11] Patent Number: 5,269,542
[45] Date of Patent: Dec. 14, 1993

[54] CHUCK JAWS

[75] Inventors: Randy R. Welch, Hudson; Norman L. Fernau, Waterloo, both of Iowa

[73] Assignee: Deere & Company, Moline, Ill.

[21] Appl. No.: 929,644

[22] Filed: Aug. 12, 1992

[51] Int. Cl.$^5$ .................. B23B 31/16; B23B 31/18
[52] U.S. Cl. ........................... 279/123; 279/106; 279/152; 279/137
[58] Field of Search ............. 279/123, 124, 106, 132, 279/137, 152, 153, 110, 35; 269/239, 287, 134, 135

[56] References Cited

U.S. PATENT DOCUMENTS

| | | | |
|---|---|---|---|
| 1,274,685 | 8/1918 | Cline | 279/123 |
| 1,797,836 | 3/1931 | Paul | 279/106 X |
| 3,385,592 | 5/1968 | Hasell et al. | 269/287 |
| 3,927,873 | 12/1975 | Chambers | 279/106 X |
| 4,353,561 | 10/1982 | Peterson | 279/35 X |

FOREIGN PATENT DOCUMENTS 947848 8/1956 Fed. Rep. of Germany ...... 279/123
3441447 6/1986 Fed. Rep. of Germany ............ 123/

*Primary Examiner*—Steven C. Bishop

[57] ABSTRACT

A chuck jaw is provided for holding an irregularly-shaped object such as a differential housing on a lathe. A chuck jaw body which is pivotally mounted to each chuck mounting block to pivot about an axis substantially tangential to a cylinder defined around the turning radius of the lathe. A first end of the chuck jaw body extends radially further in than a second end of the chuck jaw body, so that the first end can engage a radially smaller part of the irregular object, while the second end engages a radially larger part. Springs and adjustment screws preferably are provided to allow adjustment of the initial angle of the first and second ends.

6 Claims, 1 Drawing Sheet

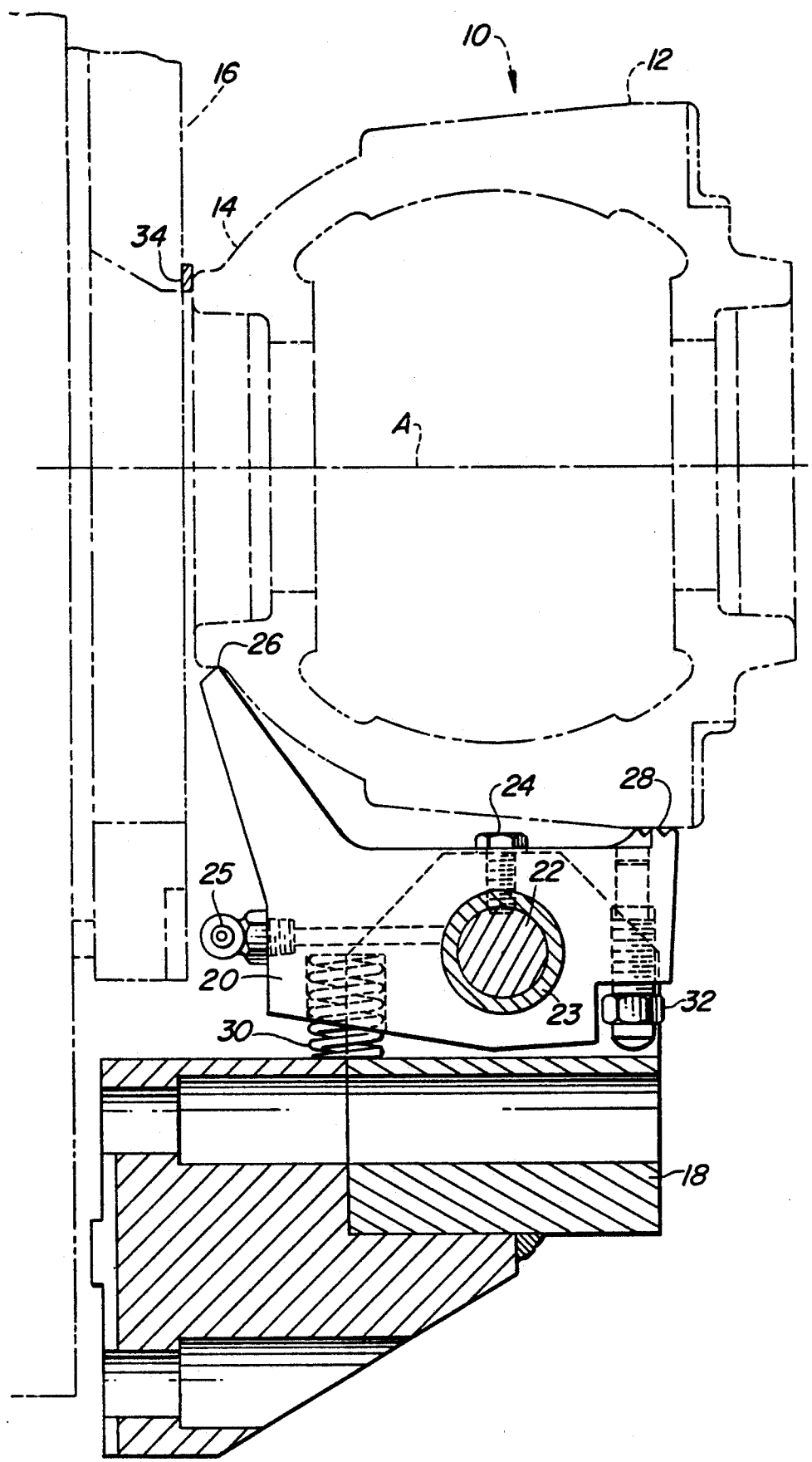

CHUCK JAWS

BACKGROUND OF THE INVENTION

1. Field of the Invention

The present invention relates to chuck jaws, and in particular, chuck jaws used for holding irregularly shaped parts for turning on a lathe.

2. Description of the Related Art

Irregularly shaped parts often must be turned on a lathe in the course of their manufacture. Unfortunately, the irregularity of the outer surface of the object can make it difficult for the lathe chuck to hold the object without stressing it.

Take the example of the differential housing 10 shown in phantom in the drawing. The differential housing 10 has a radially large part 12 near one end and a radially small part 14 near the other end. The differential housing 10 needs to be bored at each end during the normal course of manufacture. This means that the differential housing must be held stably in the lathe, with minimal distortion to the housing due to the force of the chuck.

A conventional 3-jaw, self-centering chuck typically has been be used to grip the large (flanged) end 12 of the differential housing 10 to turn it on a lathe. While a locator may be provided to axially locate the small end 14 of the differential housing, typically there is no radial support at that end. This means that it is not unusual for the differential housing 10 to move when being bored at the small end 14. Use of a higher jaw force at the large part 12 would distort the differential housing, while providing little increase in rigidity. A further complication is that due to the normal irregularity of the casting of the housing, each of the three jaws usually will only contact only at one of the two serrations on the jaw. All of this means that only a low feed rate can be used to process differential housings through a lathe, causing long cycle times and increased costs.

One possibility for solving this problem would be to substitute a 3-jaw, pull-back chuck with solid jaws contacting on three serrations for the conventional 3-jaw, self-centering chuck. The radial and axial movement of the pull-back jaws would then provide radial and axial gripping. The disadvantage to this is that a different chuck would be required from that typically used on a conventional lathe. The chuck then would have to be changed every time part production was changed, significantly increasing change-over time and costs.

SUMMARY OF THE INVENTION

It is the object of the present invention to provide a chuck jaw which will hold an irregularly shaped object, such as a differential housing, which will provide the object with radial support at both ends of the object, and which can be used on the mounting blocks of a conventional 3-jaw chuck. In addition, it is a further object of the present invention to provide such a structure which can easily be exchanged with other chuck jaws to allow rapid change-over.

These and other objects are achieved according to the present invention by providing a pivotally mounted chuck jaw body with two axially spaced contact surfaces. It is pivotal around an axis tangential to a cylinder defined about the turning axis of the lathe, with the contact surfaces on opposite sides of the pivot point. One contact surface is positioned to extend radially closer to the turning axis so as to grip the small part of the irregular object, while the other contact surface is radially further out to allow it to hold the radially large part of the irregular object.

Preferably, the chuck jaw body is biased by a spring so that one the contact surfaces engages the irregularly shaped object first in normal use. An adjustment mechanism, e.g., a set screw, also preferably is provided to enable the operator to adjust the precise angle of initial engagement.

It has been found that a much higher chuck force can be used with jaws according to the present invention than with conventional jaws, since approximately ⅓ of the force is now on the small end of the irregular object. This improved rigidity results in almost a 50% reduction in machine time. In addition, the dimensional control and axial location of the object significantly improves, and additional turning operations can now be performed on the small end of the part in the same machining cell. Tooling cost is minimal, and the chuck jaw bodies are easily replaced with similar ones to fit other irregularly shaped objects, or with standard chuck jaws.

BRIEF DESCRIPTION OF THE DRAWING

The invention will be described in greater detail with reference to the single figure, which is a cross-sectional view of a lathe chuck according to the present invention.

DETAILED DESCRIPTION OF THE PREFERRED EMBODIMENTS

A lathe 16 has a chuck jaw mounting block 18 which is radially indexable in the usual manner. A plurality of such mounting blocks 18 normally would be provided, typically three, spaced around the lathe, but only one is visible in the drawing due to the angle of the cross-sectional view.

A chuck jaw body 20 is pivotally mounted to the mounting block 18 by a pivot pin 22 and bushing 23. The pivot pin 22 lies on an axis substantially tangential to a cylinder defined about the turning axis A of the lathe 16. A set screw 24 or the like preferably is provided to hold the pivot pin 22 and bushing 23 in place, while allowing easy removal thereof. Preferably, a grease fitting 25 and line are provided to feed lubricant around the pin 22.

The chuck jaw body 20 has first and second engagement surfaces 26, 28. As can be seen in the drawing, the first engagement surface 26 extends radially closer to the turning axis A than the second engagement surface 28. The first engagement surface is selectively engageable with the irregular object, here the small part 14 of the differential housing 10 shown in phantom. Similarly, the second engagement surface 28 is selectively engageable with the large part 12 of the differential housing 10. In this cross-sectional view, the contact surfaces appear planar. Preferably, they are shaped to approximately match the shape of the object they will be gripping. For example, with the general cylindrical differential housing 10, the contact surfaces 26, 28 preferably would be curved in the plane orthogonal to the turning axis A and the plane of the drawing to match the shape of the housing. Likewise, the contact surfaces 26, 28 preferably are serrated or otherwise roughened to enhance their ability to frictionally engage the irregular object.

Preferably, a spring 30 is provided to bias the chuck jaw body 20 so that the first engagement surface 26 will engage the differential housing 10 before the second engagement surface 28. An adjustment screw 32 also preferably is provided to allow the operator to adjust the precise angle of this positioning.

OPERATION

In operation, the chuck jaws 18 are radially opened far enough to allow a differential housing 10 to be placed between them. An operator presses the differential housing 10 against an axial locator 34 on the lathe. The spring 30 will provide some force to allow initial engagement of the first engagement surface 26 with the small part 14 of the differential housing 10. Depending on the designed angle of the engagement of the first engagement surface 26 with the small part 14, the springs 30 also may assist in drawing the differential housing in towards the locator.

Once the differential housing 10 is thus positioned, the operator can adjust the adjustment screw 32 as needed to properly position the chuck jaws around the differential housing. The chuck jaws 18 can then be radially closed to provide suitable gripping force.

The differential housing then is released by opening the chuck jaws when machining is complete.

If an alternative set of chuck jaws needs to be mounted, the set screw 24 is loosened sufficiently to allow the pivot pin 22 to be removed, a new set of jaws is positioned to the mounting block, the pin 22 is replaced, and the set screw 24 re-tightened.

While the present invention has been described in conjunction with a specific embodiment, it is-understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A chuck jaw for holding an object to be turned about a turn axis, the object having a radially large part and a radially small part, and the chuck jaw comprising:
   a. a radially indexable chuck mounting block;
   b. a chuck jaw body having a first contact surface for selective engagement with the large part of the object and a second contact surface for selective engagement with the small part of the object;
   c. pivot means for pivotally mounting said chuck jaw body to said mounting block to be pivotal about an axis substantially tangential to a cylinder about said turn axis, said first and second contact surfaces being generally on opposite sides of said pivot means; and
   d. position adjustment means for adjusting the position of said jaw body in relation to said mounting block.

2. The chuck jaw of claim 1, wherein said position adjustment means comprises a threaded bolt adjustably positioned in a threaded bore formed in said chuck jaw body and engageable with an abutment surface on said mounting block to adjust the position of said jaw body.

3. The chuck jaw of claim 1, wherein said position adjustment means comprises a spring compressed between said chuck jaw body and said mounting block to bias one side of said chuck jaw body away from said mounting block.

4. The chuck jaw of claim 1, in which said second contact surface is radially closer to said turn axis than said first contact surface.

5. The chuck jaw of claim 1, in which at least one of said first and second contact surfaces is roughened to enhance its ability to frictionally engage the object.

6. The chuck jaw of claim 1, in which at least one of said first and second contact surfaces is shaped to correspond to the part of the object which the surface selectively engages.

* * * * *